United States Patent [19]
Ukon

[11] Patent Number: 6,144,728
[45] Date of Patent: Nov. 7, 2000

[54] INFORMATION NOTIFICATION SYSTEM IN A PUBLIC TELEPHONE SYSTEM

[75] Inventor: Shinichi Ukon, Tokyo, Japan

[73] Assignee: NEC Corporation, Tokyo, Japan

[21] Appl. No.: 09/205,234

[22] Filed: Dec. 4, 1998

[30] Foreign Application Priority Data

Dec. 5, 1997 [JP] Japan ................................... 9-352201

[51] Int. Cl.[7] .................................................. H04M 1/56
[52] U.S. Cl. ...................................... 379/142; 379/93.17
[58] Field of Search .................................... 379/142, 201,
379/93.17, 93.23, 354, 355, 356, 357; 455/414,
415; 358/440, 404, 411, 407

[56] References Cited

U.S. PATENT DOCUMENTS

| | | | |
|---|---|---|---|
| 5,301,035 | 4/1994 | Hayafune | 379/142 |
| 5,412,711 | 5/1995 | Hayashi | 379/142 |
| 5,517,557 | 5/1996 | Tanaka | 379/142 |
| 5,526,406 | 6/1996 | Luneau | 379/142 |
| 5,530,741 | 6/1996 | Rubin | 379/142 |
| 5,550,904 | 8/1996 | Andruska et al. | 379/142 |
| 5,590,183 | 12/1996 | Yoneda et al. | 379/142 |
| 5,796,810 | 8/1998 | Lim et al. | 379/142 |
| 5,822,416 | 10/1998 | Goodacre et al. | 379/142 |
| 5,883,942 | 3/1999 | Lim et al. | 379/142 |
| 5,894,507 | 4/1999 | Hatamura | 379/142 |
| 5,910,980 | 6/1999 | Ogasawara et al. | 379/142 |
| 5,937,052 | 8/1999 | Cook-Hellberg | 379/142 |
| 5,978,457 | 4/1994 | Feuerstein | 379/142 |
| 5,995,603 | 11/1999 | Anderson | 379/142 |
| 6,009,155 | 12/1999 | Adachi | 379/142 |

FOREIGN PATENT DOCUMENTS

| | | |
|---|---|---|
| 61-149458 | 9/1986 | Japan . |
| 63-61539 | 3/1988 | Japan . |
| 64-64465 | 3/1989 | Japan . |
| 1-152847 | 6/1989 | Japan . |
| 2-16865 | 1/1990 | Japan . |
| 2-295274 | 12/1990 | Japan . |
| 4-27258 | 1/1992 | Japan . |
| 5-68097 | 3/1993 | Japan . |
| 5-244373 | 9/1993 | Japan . |
| 6-37889 | 2/1994 | Japan . |
| 6-188879 | 7/1994 | Japan . |
| 6-268742 | 9/1994 | Japan . |
| 6-268831 | 9/1994 | Japan . |
| 9-186769 | 7/1997 | Japan . |
| 9-284382 | 10/1997 | Japan . |

Primary Examiner—Curtis A. Kuntz
Assistant Examiner—Rexford Barnie
Attorney, Agent, or Firm—Foley & Lardner

[57] ABSTRACT

A telephone system uses a called station ID data decided by a called station and informed to a specified calling station, which stores the ID data. When a call is received in the called station, the called station forwards the ID data, against which the calling station compares the ID data stored in the calling station. If both the ID data coincide with each other, the calling station delivers the telephone number of the calling station to the called station for display. This prevents the telephone number of the calling station from being open to a third party when a wrong call is made from the calling station.

8 Claims, 3 Drawing Sheets

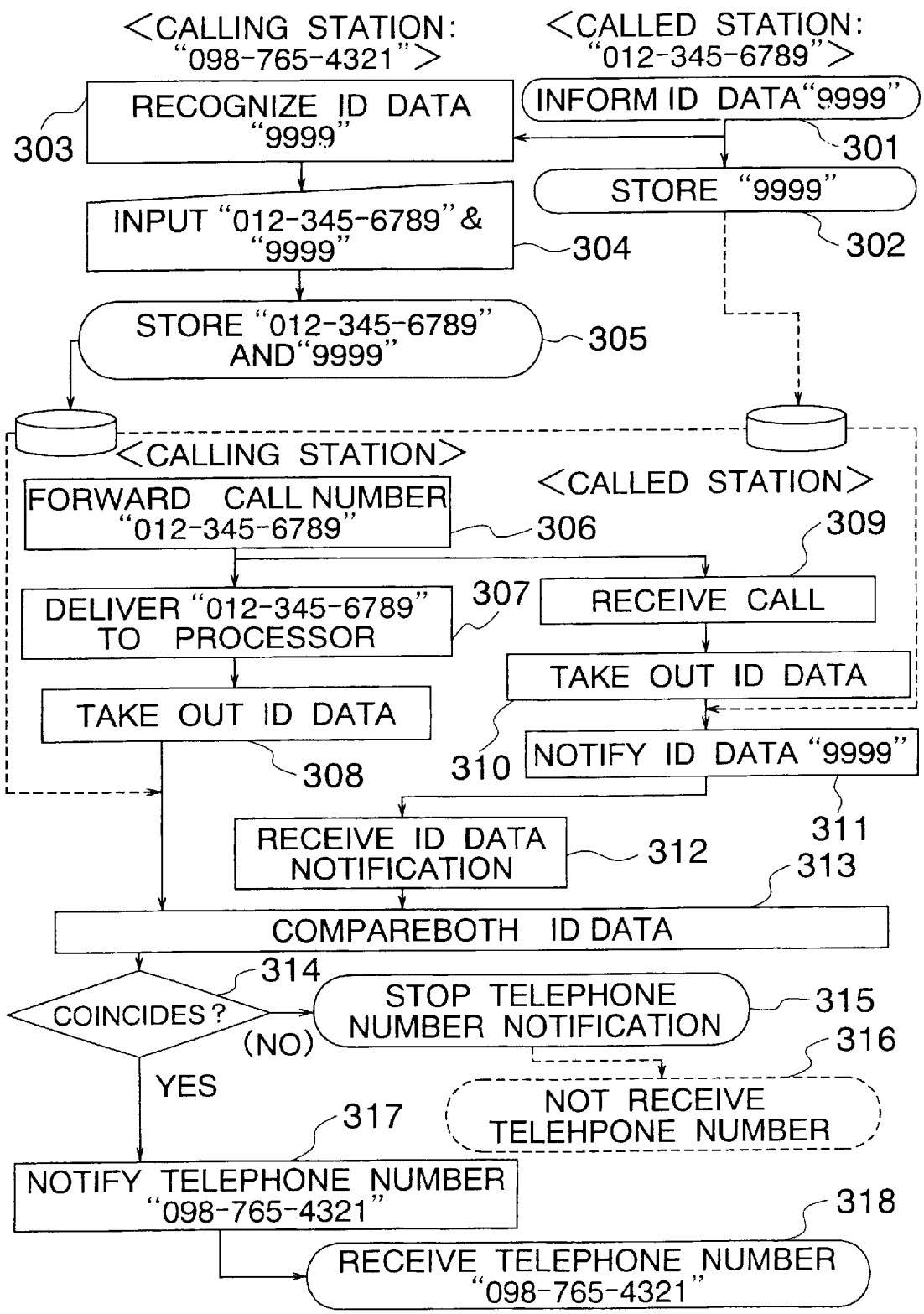

6,144,728

INFORMATION NOTIFICATION SYSTEM IN A PUBLIC TELEPHONE SYSTEM

BACKGROUND OF THE INVENTION (a) Field of the Invention

The present invention relates to an information notification system for use in a telephone system. In particular, the present invention relates to a calling station data notification system in the telephone system. The present invention also relates to a method for notifying the calling station data.

(b) Description of the Related Art

In a conventional calling station number notification system of a public telephone system, when a call is made from a calling station to a called station, the called station call number and the calling station telephone number are indicated on the displays of the calling station and the called station, respectively, which are coupled by the telecommunication system after the call.

The calling station can obtain the information, only after the call is received and the telephone line is connected to enter a telephone service, as to whether or not the call is received by the intended called station based on the speech or signal forwarded to the calling station from the called station.

In the conventional calling station number notification system, two options can be selected in the calling station when a call is made by the calling station, including the first option wherein the calling station telephone number is notified without fail and the second option wherein the calling station telephone number is not notified on the contrary.

The conventional calling station number notification system has a problem in that the calling station telephone number is notified even if a wrong call number is input at the calling station, which makes the personal data, i.e., telephone number, of the calling station is open to a third party to which the calling station does not wish to disclose the personal data.

SUMMARY OF THE INVENTION

It is therefore an object of the present invention to provide a calling station number notification system which is capable of preventing the personal data of the calling station is not open to the third party to which the calling station does not wish to disclose the personal data.

The present invention provides a telephone system comprising a plurality of stations including a calling station and a called station to be connected by a call for telephone service, the called station having an own station ID data storage section for storing a first ID data of the called station and an ID data notification section for notifying the first DD data stored in the own station ID data storage section to the calling station when the call is received from the calling station, the calling station having an input section for inputting a call number and a second ID data of the called station, a called station ID data storage section for storing the second ID data input by the input section, a judgement section for comparing the second ID data stored in the called station ID data storage section against the first ID data supplied from the ID data notification section to judge a coincidence of both the ID data, a calling station data notification section for notifying a calling station data to the called station when both the ID data coincide with each other.

The present invention also provides a method for communicating between a calling station and a called station comprising the steps of informing a called station ID data from the called station to the calling station beforehand, storing the called station ID data in the called station, storing the informed called station ID data in the calling station, forwarding the called station ID data stored in the called station to the calling station when a call is made from the calling station to the called station, comparing the informed called station ID data stored in the calling station against the forwarded called station ID data so as to judge a coincidence of both the called station ID data, and forwarding a calling station data from the calling station to the called station when both the called station ID data coincide with each other.

In accordance with the present invention, the calling station data is not open to a third party if a wrong call number is input at the calling station. Thus, the calling station data is not subjected to disclosure to the third party against which the calling station wishes to protect the own data such as a telephone number.

Now, the present invention is more specifically described with reference to accompanying drawings, wherein similar constituent elements are designated by similar reference numerals.

BRIEF DESCRIPTION OF DRAWINGS

FIG. 3 is a flowchart of a concrete example of the process of FIG. 2.

PREFERRED EMBODIMENTS OF THE INVENTION

Now, the present invention is more specifically described with reference to accompanying drawings.

Figure 1:
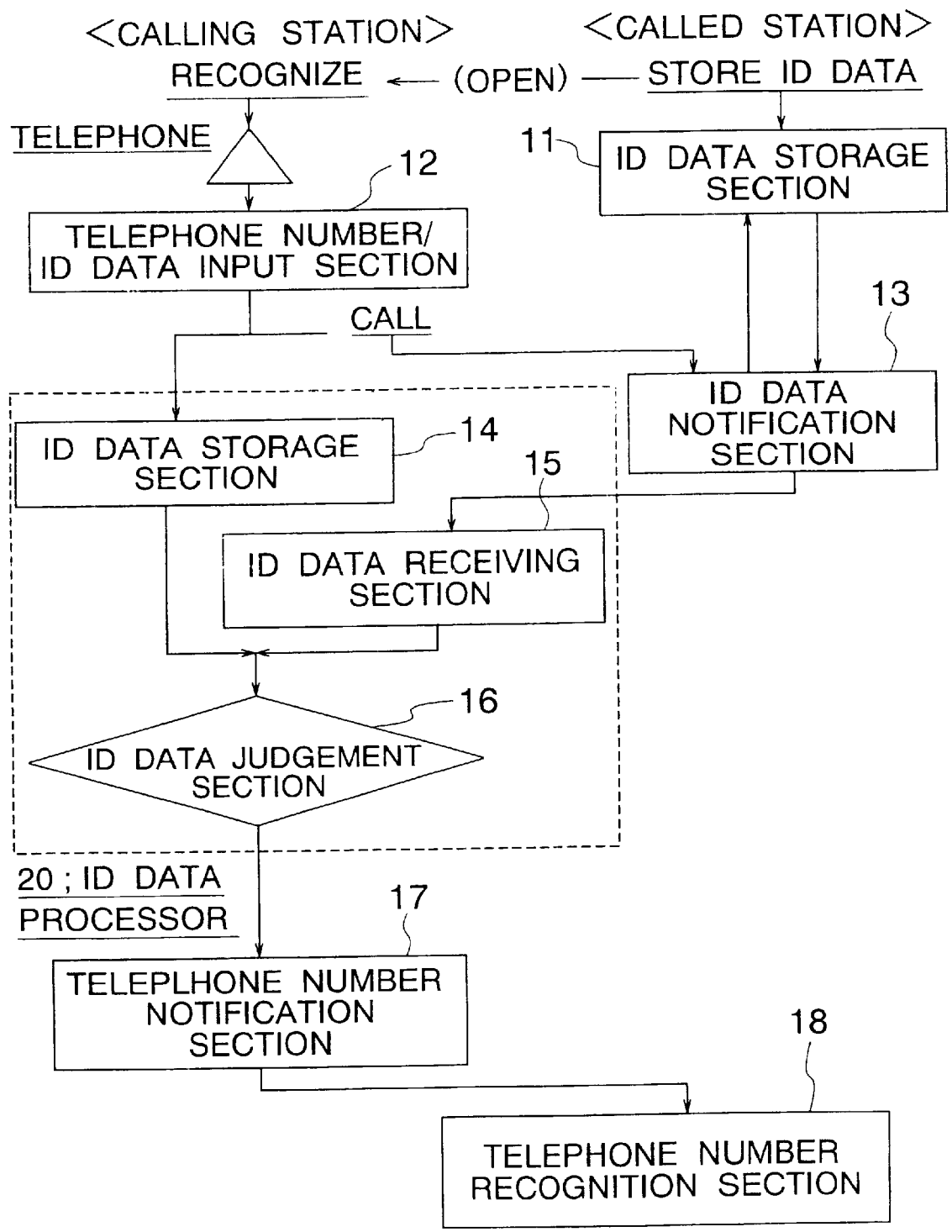
FIG. 1 is a block diagram of a calling station number notification system in a public telephone system according to an embodiment of the present invention.

Referring to FIG. 1, a telephone system having a calling station number notification system according to an embodiment of the present invention includes a calling station and a called station. The called station has an identification (ID) data storage section 11 for storing called station ID data which is determined by itself and to be informed to the specified calling station, an ID data notification section 13 for notifying the called station ID data when a call is received, and a telephone number recognition section 18 for recognizing calling station telephone number supplied from the calling station. The called station transmits the called station ID data stored in the data storage section 11 to the calling station at any time when the own station is called.

The calling station has a call number/ID data input section 12, an ID data processor 20, and a telephone number notification section 17 for notifying the calling station telephone number to the called station. The ID data processor 20 includes an ID data storage section 14, an ID data receiving section 15, and an ID data judgement section 16.

The call number/D data input section 12 delivers the called station ID data to the ID data storage section 14 by either: (1) inputting the called station ID data beforehand to form a data base of the same in combination with the call number (or telephone number) of the called station before making a call; or (2) inputting the called station ID data simultaneously with making a call and forwards the same in combination with the call number.

The ID data notification section 13 of the called station notifies the called station ID data, read out from the ID data storage section 11 of the own station, to the calling station after the called station received a call from the calling station.

The ID data storage section 14 of the calling station stores the called station ID data supplied through the ID data input section 12. The ID data storage section 14 takes out the called station ID data corresponding to the call number from the database, or receives the called station ID data supplied simultaneously with making a call, and then forwards the same to the ID data judgment section 16 after a call is transmitted from the calling station.

The ID data receiving section 15 receives and recognizes the called station ID data notified from the called station after the call is received in the calling station. Then, the called station ID data is forwarded to the ID data judgment section 16.

The ID data judgment section 16 judges whether or not the called station ID data supplied from the ID data storage section 14 coincides with the called station ID data received by the ID data receiving section 15. The result of judgement is delivered to the telephone number notification section 17. If the called station ID data supplied from the ID data storage section 14 coincides with the called station ID data delivered from the ID data receiving section 15, an approval of telephone number notification is delivered to the telephone number notification section 17.

The telephone number notification section 17 notifies the calling station telephone number to the called station only when the notification is approved based on the result of judgement supplied from the ID data judgment section 16.

The telephone number recognition section 18 of the called station receives the notified calling station telephone number and starts for processing a variety of services based on the notified telephone number.

Figure 2:
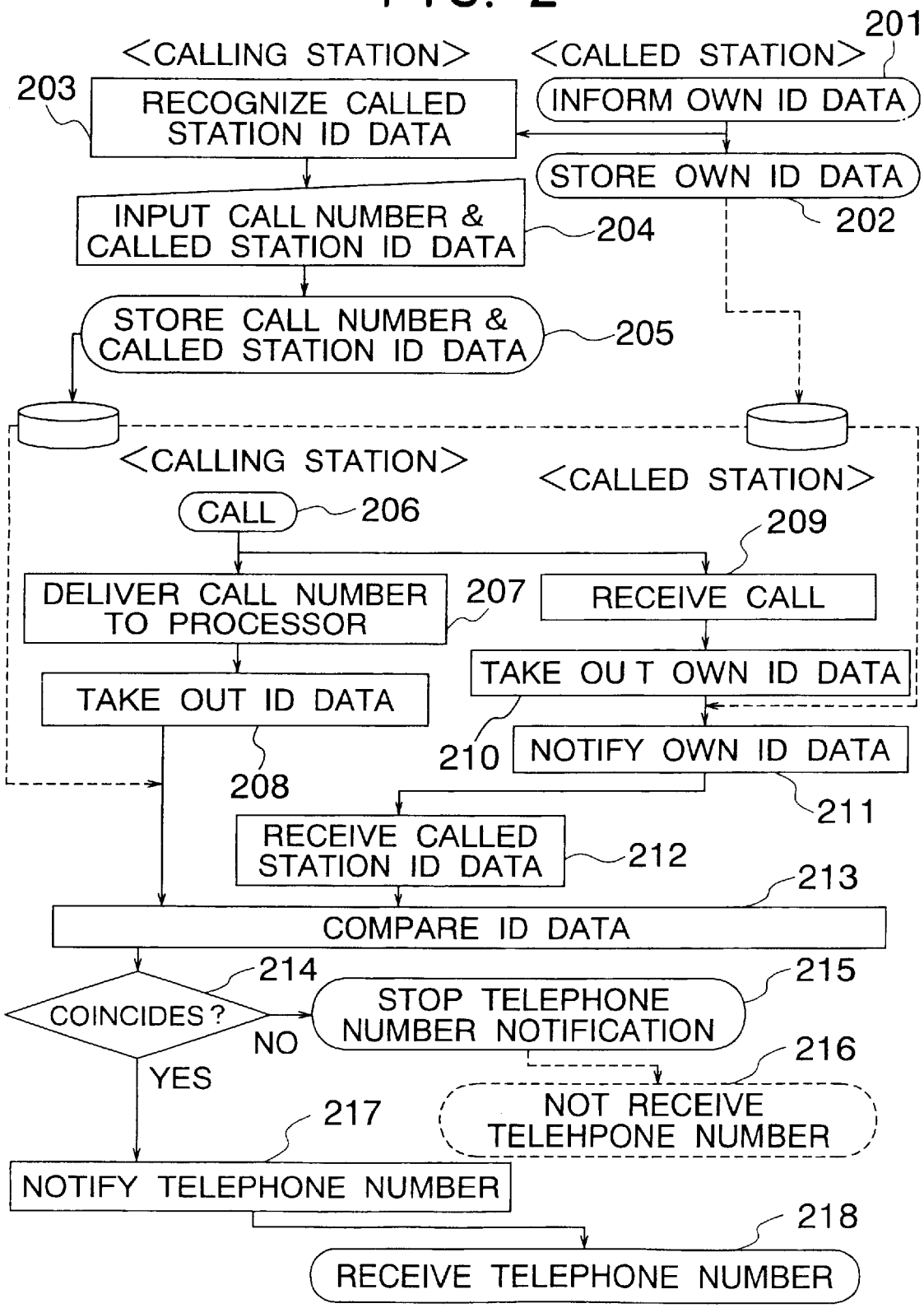
FIG. 2 is a flowchart of the process in the telephone system of FIG. 1.

Referring to FIG. 2, there is shown an example of the flowchart of the telephone system of FIG. 1.

The called station decides own ID data beforehand. The called station ID data is informed to one or more calling stations, of which telephone number notification the called station wishes to receive (step 201). The called station stores the called station ID data in the called station ID data storage section 11 (step 202).

The calling station recognizes the called station ID data (step 203), and inputs the called station call number and corresponding called station ID data beforehand by using the call number/ID data input section 12 (step 204).

The called station ID data input by the call number/ID data input section 12 is delivered to the ID data storage section 14 of the calling station together with the called station call number. The ID data storage section 14 stores in the database thereof the called station ID data and the corresponding call number in combination (step 205).

When the calling station delivers a call to the called station by forwarding the called station call number (step 206), the calling station delivers the called station call number to the ID data storage section 14 of the calling station at the same time (step 207). The ID data storage section 14 takes out the called station ID data corresponding to the called station call number stored in the database.

When the called station receives the call from the calling station (step 209), the ID data notification section 13 of the called station takes out the called station ID data stored in the ID data storage section 11 of the called station (step 210) to notify the called station ID data to the calling station (step 211).

The ID data receiving section 15 of the calling station receives and recognizes the called station ID data hotification forwarded from the ID data notification section 13 (step 212).

The ID data judgment section 16 compares the called station ID data stored in the ID data storage section 14 of the calling station against the called station ID data received by the ID data receiving section 15 from the called station (step 213). If both the called station ID data do not coincide with each other at step 214, the calling station telephone number is not notified to the called station (step 215). Thus, the called station does not receive the calling station telephone number (step 216).

If both the called station ID data coincide with each other at step 214, the calling station telephone number is notified to the called station by the calling station number notification section 17 (step 217). The called station receives the calling station telephone number by the telephone number recognition section 18 (step 218).

If the ID data storage section 14 of the calling station does not store the called station call number and the called station ID data beforehand, when the calling station is to deliver a call to the called station (step 206), the calling station inputs the called station ID data together with the input of the called station call number by using the call number/ID data input section 12 (step 204). The called station ID data is forwarded together with the corresponding call number to the ID data storage section 14 of the calling station for storage thereof (step 205). Simultaneously, the stored called station ID data is taken out for recognition (step 208). The following steps are similar to the steps as described before.

In the present embodiment, if the calling station delivers a wrong call number of the called station, the telephone number of the calling station is not notified to the wrong called station. Thus, the personal data is not open to a third party to which the call is not intended.

In the above configuration, the disclosure of the called station ID data is limited to the specified calling stations to which the called station wishes to disclose the ID data. For instance, if the calling station is a corporate which wishes to receive calls from unspecified calling stations that request services from the corporate, it can receive such calls by informing the own ID data to the public. On the other hand, if the called station is an individual who wishes to receive calls only from specified calling stations, the called station can limit the specified calling stations by limiting the range of the disclosure of the ID data. Thus, the telephone number of the calling station is not open to the third party to which the calling station does not wish to disclose the own telephone number.

Referring to FIG. 3, there is shown a concrete example of the process shown in FIG. 2, wherein the called station ID data which is informed to the calling station is "9999" (or a four-digit code number), the called station call number is "012-345-6789", and the calling station telephone number is "098-765-4321".

The called station ID data "9999" decided by the called station is informed to one or more calling stations, of which telephone number notification the called station wishes to receive (step 301). The called station ID data "9999" is then stored in the ID data storage section 11 (step 302) of the called station. The calling station recognizes the called station ID data "9999" (step 303), and inputs the called station call number "012-345-6789" and the ID data "9999" in combination beforehand by using the call number/ID data input section 12 (step 304).

The called station ID data "9999" is when supplied together with the corresponding call number "012-345-6789" to the ID data storage section 14 of the calling station for storage thereof (step 305).

When the calling station makes a call to the called station by inputting the called station call number "012-345-6789" (step 306), the call number is also delivered to the ID data storage section 14 of the calling station (step 307). The ID data storage section 14 takes out the called station ID data "9999" corresponding to the stored call number for recognition thereof (step 308).

When the called station receives the ball from the calling station (step 309), the ID data notification section 13 of the called station takes out the own ID data "9999" stored in the ID data storage section 11 (step 310), to notify the called station ID data to the calling station (step 311).

The ID data receiving section 15 of the calling station receives the ID data "9999" forwarded from the ID data notification section 13 of the called station and recognizes the same (step 312). The ID data judgment section 16 compares the ID data "9999" stored in the ID data storage section 14 of the calling station against the ID data "9999" forwarded from the called station and received by the ID data receiving section 15 (step 313), thereby judging the coincidence of both the ID data (step 314).

If both the ID data do not coincide with each other at step 314, the calling station telephone number is not notified to the called station (step 315). Thus, the called station does not receive the calling station telephone number notification (step 316).

In this example, since both the ID data "9999" coincide with each other at step 314, the calling station telephone number "098-765-4321" is notified to the called station by the calling station number notification section 17 (step 317). The telephone number recognition section 18 (step 318) of the called station receives the calling station telephone number "098-765-4321".

If the calling station does not store the called station call number "012-345-6789" and the called station ID data "9999" beforehand, when the calling station makes a call to the called station (step 306), the calling station inputs the called station ID data "9999", which has been recognized at step 303, together with the called station call number by using the call number/ID data input section 12 (step 304). The supplied ID data "9999" is forwarded together with the corresponding call number to the ID data storage section 14 of the calling station for storage thereof (step 305). The stored called station ID data "9999" is then taken out for recognition (step 308).

Examples of the information for use in the ID data notification include, for instance, (1) four-digit arbitrary code number, and (2) a combination of digits for representing letters and numbers, such as a free word message in a pager system, which may express a personal name, a corporate name, or a brand name. The calling station telephone number notified to the called station may be replaced by any other calling station data such as a name or abbreviate of the calling station.

Since the above embodiments are described only for examples, the present invention is not limited to the above embodiments and various modifications or alterations can be easily made therefrom by those skilled in the art without departing from the scope of the present invention.

What is claimed is:

1. A telephone system comprising a plurality of stations including a calling station and a called station to be connected by a call for telephone service, said called station having an own station ID data storage section for storing a first ID data of said called station and an ID data notification section for notifying said first ID data stored in said own station ID data storage section to said calling station when the call is received from said calling station, said calling station having an input section for inputting a call number and a second ID data of said called station, a called station ID data storage section for storing said second ID data input by said input section, a judgement section for comparing said second ID data stored in said called station ID data storage section against said first ID data supplied from said ID data notification section to judge a coincidence of both said ID data, a calling station data notification section for notifying a calling station data to said called station when both said ID data coincide with each other.

2. The telephone system as defined in claim 1, wherein said calling station data is a telephone number of said calling station.

3. The telephone system as defined in claim 1, wherein said input section inputs said second ID data each time said calling station makes a call to said called station.

4. The telephone system as defined in claim 1, wherein said called station ID data storage section stores said second ID data in a data base in combination with a called station call number.

5. A method for communicating between a calling station and a called station comprising the steps of informing a called station ID data from said called station to said calling station beforehand, storing said called station ID data in said called station, storing said informed called station ID data in said calling station, forwarding said called station ID data store(d in said called station to said calling station when a call is made from said calling station to said called station, comparing said informed called station ID data stored in said calling station against said forwarded called station ID data so as to judge a coincidence of both said called station ID data, and forwarding a calling station data from said calling station to said called station when both said called station ID data coincide with each other.

6. The method as defined in claim 5, wherein said calling station data is a telephone number of said calling station.

7. The telephone system as defined in claim 5, wherein said calling station inputs said called station ID data for storage thereof each time said calling station makes a call to said called station.

8. The telephone system as defined in claim 5, wherein said calling station stores said called station ID data in a data base in combination with a called station call number.

* * * * *